July 13, 1954

H. A. F. ROCHA
UNWANTED REFLECTION ABSORBING
SHEAR WAVE TRANSDUCER
Filed July 11, 1952

2,683,821

Inventor:
Henrique A.F. Rocha,
by Russell A. Warner
His Attorney.

Patented July 13, 1954

2,683,821

UNITED STATES PATENT OFFICE 2,683,821

UNWANTED REFLECTION ABSORBING SHEAR WAVE TRANSDUCER

Henrique A. F. Rocha, Schenectady, N. Y., assignor to General Electric Company, a corporation of New York Application July 11, 1952, Serial No. 298,325

1 Claim. (Cl. 310—8.2)

My invention relates to transducer holders for use in the ultrasonic shear wave testing of materials, and its object is to provide a high sensitivity transducer holder designed so as to entrap and absorb unwanted wave reflections so that they will not cause confusion with the desired testing wave signals. My improved transducer holder is used for shear wave ultrasonic testing, the principle of which is described in United States Patent No. 2,527,986, October 31, 1950.

As illustrated in such patent, a common form of transducer holder for shear wave testing consists of a longitudinal wave transducer mounted on one side of a wedge-shaped piece, the other side of the wedge being in contact with the object under test. The angle of the wedge is comprised between the first and the second critical angles, the first critical angle being the angle at which the refracted longitudinal component is perpendicular to the normal at the point of incidence, the second critical angle being the angle at which the refracted shear component is perpendicular to the normal at the point of incidence.

Such holders as heretofore designed have used quartz crystal transducers with a sufficiently low mechanical output signal level that reverberations within the wedge were not serious. However, if the quartz crystal in the conventional holder were replaced by a transducer made of barium titanate, which gives a very much higher mechanical output for the same energizing voltage, objectionable reverberations would be formed in the wedge which would obscure the reception of echo signals for a considerable time after the initial pulse.

According to my invention, I employ a wedge designed to entrap and absorb these reverberations before they return to the transducer.

The features of my invention which are believed to be novel and patentable will be pointed out in the claim appended hereto. For a better understanding of my invention reference is made in the following description to the accompanying drawing in which Fig. 1 represents a prior art transducer unit included to explain objectionable reverberation characteristics which my invention eliminates;

Figure 1:
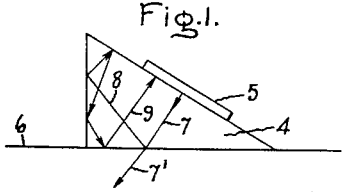

Referring now to the prior art transducer holder of Fig. 1, a transducer 5 made of quartz crystal is mounted on a wedge-shaped object 4 made of a plastic material like polystyrene or acrylic resin (sold under the trade names of Plexiglas and Lucite), having high acoustical transparency.

Through suitable connections, electrical impulses are applied to the transducer 5 which transforms them into mechanical ultrasonic vibrations and transmits them through the wedge 4 into the test piece 6 as represented by the arrows 7 and 7'. A cathode ray oscillograph, not shown, is used to compare the time relation of the transmitted and received signals, and from which the location of defects may be ascertained.

In the transducer holder just described a portion of the wave 7 is reflected back into the wedge as represented by arrow 8, and after reflection from various surfaces of the wedge, may be directed back to and be received by transducer 5 as represented by arrow 9 and the other arrows interconnecting arrows 8 and 9. The wave represented by arrow 9 may again be reflected from the surface with 5 and eventually be reflected back to transducer 5. Such unwanted reverberations are converted into electrical signals by the transducer and if they have enough amplitude, they will produce in the cathode ray tube a pattern resembling an extension of the initial pulse. This effect obscures the detection of echoes arriving at the transducer a short time after the initial pulse dies out.

In the case of quartz crystal transducers, these reverberations are small enough to be considered unobjectionable. However, if high mechanical output transducers such as barium titanate are used, the reverberations completely obscure the trace of the cathode ray tube for an objectionably long time, usually exceeding 100 microseconds.

Figure 2:
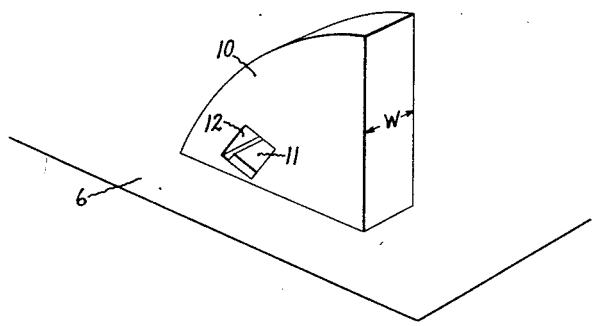
Fig. 2 represents a perspective view of my improved transducer unit.
Figure 3:
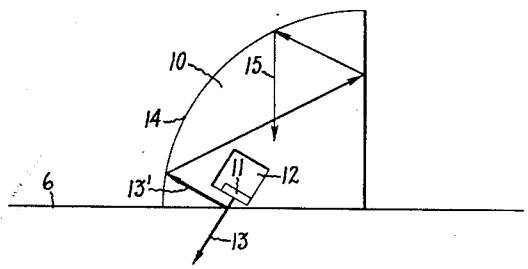
Fig. 3 represents a side view thereof illustrating how objectionable reflected waves are entrapped and absorbed.

Referring now to Figs. 2 and 3, I employ a holder 10 which is preferably a block of solid material having a relatively low acoustic transparency, such as may be purchased under the trade names Bakelite or Textolite. This may be a resin compound laminated with cloth or paper or containing a wood filler. Many solid materials are available having the desired low acoustic transparency or desired sound absorbing properties and may be used, but it should not be a material containing voids such as is used for soundproofing, because for my purposes it must also be able to transmit the desired waves through short thicknesses thereof as will presently appear. The transducer 11 is contained in a lateral opening 12 through the holder which is closely spaced from the bottom surface which contacts with the material to be tested 6.

The lower surface of the opening 12 which forms a shelf for the transducer is cut at an angle comprised between the first and the second critical angles as described above and only enough material is left at the lower corner of the window to assure a continuous lower surface and rigidity. Thus the distance between the lower corner of the recess 12 and the lower surface of holder 10 may be 1/32 inch. It is thus seen that the distance which the ultrasonic sound waves must travel between transducer 11 and the test piece 6 through the material of the holder 10 is preferably kept as small as practicable so that even though a material having relatively low acoustic transparency is used, there is good transmission of the desired signals to and from the material 12. The wave given out by transducer 11 and entering material 6 is represented by arrow 13 in Fig. 3.

A portion of this wave is internally reflected from the lower surface of the holder 10 represented by arrow 13'. However, it is then reflected from surface 14 of the holder in an upward direction above transducer 11 and the opening 12 into a region of the holder 10 where it is entrapped and absorbed by the material of low acoustic transparency before it can reach the transducer 11. Thus the wave 13' is shown as being reflected from surface 14, then from the vertical right wall of the holder back to an upper region of wall 14 and then downward as indicated by arrow 15. As this unwanted wave travels upwardly around the opening and then through considerable distances in the holder 10, its intensity is continuously decreasing and is completely absorbed before it can cause confusion with the desired signal waves. The exact shape and extent of the holder 10 above opening 11 is not of great importance. However, the shape and dimensions represented, comprising substantially a quarter section of a cylinder with one of its radial walls serving as the surface for contacting the test material, take good advantage of the features described with a minimum amount of holder material.

Because the holder has been made substantially noise-free, it is now possible and desirable to make use of a high output transducer. I, therefore, prefer to make the transducer 11 of barium titanate which has an output of the order of 100 times that of a quartz crystal for a given voltage applied thereto. The use of ultrasonic waves of high intensity is thus practicable. They suffer little attenuation in passing through the short path between transducer and test piece, but the waves reflected in the direction of arrow 13' suffer great attenuation and are entrapped and absorbed and cease to be a limiting factor with respect to the wave intensity that is practicable to use. A high output high sensitivity transducer unit free from self-generated noise results. The transducer unit represented in the drawing has dimensions suitable for a test frequency of 1,000,000 cycles per second. The optimum length of the transducer 11 measured in the direction of arrow 13' is about one-fourth inch and would decrease with an increase in frequency or an increase in the attenuation factor of the material of which the holder 10 is made. The attenuation would increase with both of these factors. Decreasing the width of the transducer 11 would decrease the average distance between its lower face and the test piece 6.

The width of the transducer unit indicated by $w$ in Fig. 2 is immaterial to its operation and is determined by the width of the material to be tested, ease in handling, etc.

In accordance with the provisions of the patent statutes I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is:

A transducer unit for shear wave ultrasonic testing comprising a holder in the general shape of a quarter section of a cylinder, with one of its radial walls serving as the surface for contacting with the material to be tested, an axial opening through said section with its bottom surface as near as practicable to the test material contacting surface, a barium titanate transducer positioned on the bottom surface of said opening, said bottom surface being at an angle to the test material contacting surface of said holder suitable for the transmission of shear waves from said transducer into the material to be tested and for the internal reflection of waves from the test material surface of the holder against the curved wall of the holder and from the curved wall into the holder above the opening therein, said holder being made of a solid material having low acoustic transparency such that the internally reflected waves are absorbed in the material before they can cause interference with test signals.

References Cited in the file of this patent

UNITED STATES PATENTS

| Number | Name | Date |
|---|---|---|
| 2,527,986 | Carlin | Oct. 31, 1950 |
| 2,628,335 | Drake | Feb. 10, 1953 |
| 2,649,550 | Hardie | Aug. 18, 1953 |